2,876,239
Patented Mar. 3, 1959

2,876,239

PRODUCTION OF POLYMERIC COMPOSITIONS AND DERIVATIVES THEREOF

Amelio E. Montagna and Donald G. Kubler, South Charleston, and Julius J. Brezinski, Dunbar, W. Va., assignors to Union Carbide Corporation, a corporation of New York No Drawing. Application June 21, 1955
Serial No. 517,074

11 Claims. (Cl. 260—484)

This invention relates to the production of novel polymeric organic compositions, and more especially it concerns the production thereof from certain 2-substituted tetrahydropyrans and ketene.

It also includes the production from such polymeric compositions of 3-alkoxy-7-hydroxyheptanoic acids and the hydrocarbon-substituted 3-alkoxy-7-hydroxyheptanoic acids; and the production from such acids of esters thereof.

Processes are now known whereby monomeric esters of 3-alkoxyalkanoic acids can be made by reacting ketene with acetals whereby a carbon-oxygen bond of an acetal linkage is split and the ketene group is inserted:

$$CH_2(OCH_3)_2 + CH_2CO \rightarrow CH_3OCH_2CH_2COOCH_3$$

When the acetal employed is unsymmetrical, a mixture of esters is the expected result because the ketene may be introduced at either carbon-oxygen bond of the acetal function.

The present invention is based in important part upon the discovery that, in the presence of acidic catalysts, and particularly acidic Friedel-Crafts type catalysts, such as boron trifluoride, zinc chloride, aluminum chloride, ferric chloride, sulfuric acid, and the like, certain 2-substituted tetrahydropyrans, and more specifically 2-alkoxytetrahydropyrans, are readily condensed with ketene to yield a novel and useful class of polymeric compositions. In the reaction involved the 2-alkoxytetrahydropyran functions as a heterocyclic, unsymmetrical acetal, but unexpectedly, cleavage of the acetal function by ketene occurs predominantly between the heterocyclic oxygen and the alkoxy substituted carbon atom of the pyran ring, whereby polymeric compositions are produced. The expected product from the reaction of ketene and a 2-alkoxytetrahydropyran is a mixture of two products, that just described and that resulting from cleavage of the acetal function at the bond between the alkoxy-substituted carbon atom of the pyran ring and the oxygen atom of the alkoxy group attached to said carbon atom. The discovery of the selective cleavage of the acetal function at one of the carbon-oxygen bonds in this type of unsymmetrical acetal constitutes one of the novel features of this invention.

The polymeric compositions have utility as plasticizers and as lubricants. Such compositions also are important chemical intermediates in the synthesis of valuable organic compounds, as hereinafter illustrated. Thus, saponification of these polymeric compositions derived from 2-alkoxytetrahydropyrans yields 3-alkoxy-7-hydroxyheptanoic acids; while those derived from 2,6-dialkoxytetrahydropyrans yield a series of (3-alkoxy-6-formylhexanoic acids) and/or 3,7-dialkoxyazelaic acids and/or 3-hydroxy-7-alkoxyazelaic acids; and those derived from 6-carbalkoxy-2-alkoxytetrahydropyrans yield a series of 2-hydroxy-6-alkoxysuberic acids.

In accordance with the invention ketene is reacted with a 2-alkoxytetrahydropyran or a substituted 2-alkoxytetrahydropyran having a structure represented by the formula:

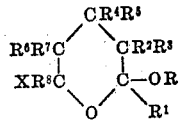

wherein $R^1$, $R^2$, $R^3$, $R^4$, $R^5$, $R^6$, $R^7$ and $R^8$, respectively, designates a radical of the class consisting of hydrogen and the alkyl and aralkyl radicals; and R may be any of these same radicals except hydrogen; and X designates a member of the class consisting of hydrogen and the alkyl, aralkyl, alkoxy and carbalkoxy groups. Compounds of this type wherein $R^1$ to $R^8$ designate hydrogen, or a lower alkyl group containing 1 to 4 carbon atoms, usually are preferred reactants.

Among the 2-alkoxytetrahydropyrans and hydrocarbon-substituted alkoxytetrahydropyrans useful as starting materials with the invention may be mentioned the following although others also can be used:

2-ethoxytetrahydropyran
2-methoxytetrahydropyran
2-[2-ethylhexoxy]tetrahydropyran
2-ethoxy-4-methyltetrahydropyran
2-ethoxy-3-ethyl-4-methyltetrahydropyran
2-ethoxy-5-methyltetrahydropyran
2-butoxy-5-methyltetrahydropyran
2-butoxy-4-propyltetrahydropyran
2-[2-ethylhexoxy]-4-propyltetrahydropyran
2-ethoxy-4-propyl-5-ethyltetrahydropyran
2-ethoxy-3,5-diethyl-4-propyltetrahydropyran
2,6-diethoxytetrahydropyran
2,6-diethoxy-4-methyltetrahydropyran
2,6-dibutoxytetrahydropyran
2-carbethoxy-6-ethoxytetrahydropyran
2-carb-butoxy-6-butoxytetrahydropyran
2-carb-butoxy-2,5-dimethyl-6-butoxytetrahydropyran The novel polymeric compositions of the invention are formed of recurring units of the formula:

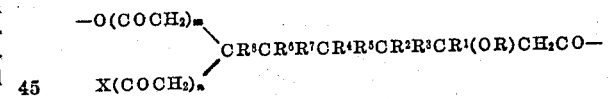

wherein each $R^1$ to $R^8$, respectively, designates a radical of the class consisting of hydrogen, and the alkyl and aralkyl radicals; and R designates these same radicals except hydrogen; and X designates a radical of the class consisting of hydrogen, and the alkyl, aralkyl, alkoxy and carbalkoxy radicals; and $m+n$ is selected from the class consisting of 0 and 1 when X designates an alkoxy radical, and both $m$ and $n$ are 0 when X is any other radical of the class designated by X. Thus, R and $R^1$ to $R^8$ can be methyl, ethyl, isopropyl, butyl, hexyl, 2-ethylhexyl, decyl, tetradecyl, octadecyl, benzyl radicals, and the like; and X can represent the foregoing, and alkoxy groups, such as methoxy, ethoxy, butoxy, 2-ethylhexoxy and decyloxy groups, and carbalkoxy groups such as carbmethoxy, carbethoxy and carb-2-ethylhexoxy groups.

The process conveniently is conducted by introducing gaseous ketene into a solution of the acidic catalyst in an excess of the substituted tetrahydropyran within a kettle provided with means for cooling and agitating. Reaction temperatures within the range from $-80°$ C. to $100°$ C. and preferably from about $-10°$ C. to amount $+15°$ C. are employed, the temperature being controlled by regulating the rate of addition of the ketene and by cooling. Amounts of catalyst within the range from 0.01% to 10% or more can be used effectively. The catalyst can be used in solution in an inert solvent, such as ethyl ether, carbon tetrachloride, acetic anhydride, or other suitable solvent known to the art.

The reaction mixture from this exothermic reaction then is neutralized with an alkaline compound such as sodium ethoxide, sodium acetate, sodium hydroxide, sodium carbonate, sodium bicarbonate, the corresponding potassium compounds, amines, solutions of these compounds, and other basic materials known to the art for neutralizing acidic catalysts. The unreacted portion of the substituted tetrahydropyran can be removed from the neutralized reaction mixture in various ways, as by steam distillation, or by vacuum distillation. Inorganic salts can be removed, if desired, by washing the product, or a solution thereof in an inert solvent, with water; or by filtration.

Where a 2-alkoxytetrahydropyran or 2-alkoxyhydrocarbon-substituted tetrahydropyran having a single acetal function is used, it can be condensed with a single mol of ketene, yielding polymeric compositions of the type

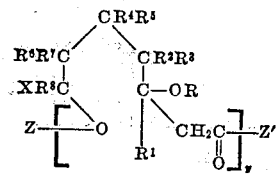

wherein Z and Z' represent chain terminating groups; and y is a value of at least 2.

In instances where a 2,6-dialkoxytetrahydropyran or a hydrocarbon-substituted derivative having two acetal functions is reacted with one mol of ketene, polymeric products of the type illustrated by the formula (A)
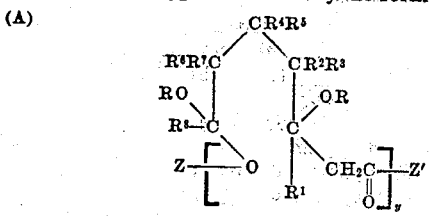

are produced; whereas when between one and two mols of ketene are reacted per mol of the pyran derivative the products are a composite of one or more of units A, B and C.

(B)
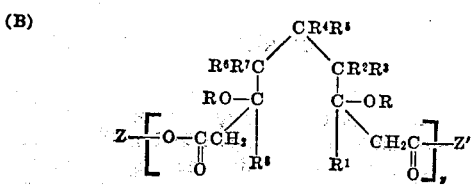

(C)
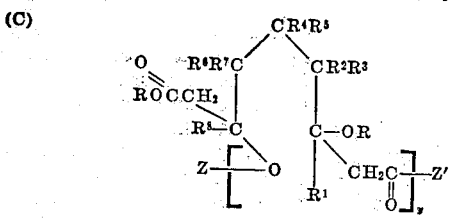

The polymeric compositions obtained by reacting ketene with a 6-carbalkoxy-2-alkoxytetrahydropyran and corresponding hydrocarbon substituted tetrahydropyrans are composed of ketene and pyran residues in a 1:1 molar ratio, and have the following recurring structure:

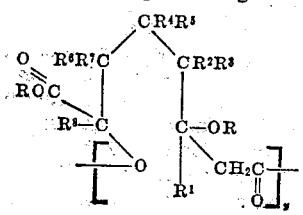

The polymeric compositions obtained from the reaction of ketene on those tetrahydropyranyl compounds having one acetal function, such as 2-ethoxytetrahydropyran, 2-ethoxy-4-methyltetrahydropyran and 6-carbethoxy-2-ethoxytetrahydropyran, are thick liquids having viscosities ranging around 1000 centistokes or higher at 100° C., and molecular weights ranging from about 325 to 3000 and higher. Generally, the polymeric products made by reacting ketene and the 2,6-dialkoxytetrahydropyrans have lower viscosities and lower molecular weights, as indicated in the accompanying examples.

The following examples will serve to illustrate the invention:

Example 1

To 1297 grams (9 mols) of 2-ethoxy-4-methyltetrahydropyran cooled to —10° C. by means of circulating brine in a cooling jacket, there was added 40 cc. of a 32% solution of boron trifluoride in diethyl ether. Into the cooled solution then was bubbled 237 grams (5.6 mols) of ketene during 2.5 hours while maintaining the reaction mixture between —10° and —3° C. To the cold agitated reaction mixture then was added a solution of 50 grams of sodium acetate in 300 cc. of water, and the thick heterogeneous solution was agitated for one hour. It was found that 202.5 grams (4.8 mols) of ketene had been absorbed during the reaction. The unreacted 2-ethoxy-4-methyltetrahydropyran was stripped from the reaction mixture by steam distillation, a total of 245 grams (1.7 mols) of the pyran being recovered. The residue was dissolved in one liter of diisopropyl ether, and this was extracted several times with water to remove inorganic salts completely. After removal of the diisopropyl ether from the extracted solution, and the removal of certain neutral, non-saponifiable low-boiling side products by distillation at 60° to 107° C. under 3 mm. of mercury pressure there was recovered 669 grams of the 1:1 adduct of ketene and 2-ethoxy-4-methyltetrahydropyran in the form of a viscous light-yellow oil having the following properties: saponification equivalent 183.7 (theory for the 1 to 1 adduct of ketene and 2-ethoxy-4-methyltetrahydropyran is 186.2); elemental analysis in percent by weight:

| | Found | Calculated for $(C_{10}H_{18}O_3)_x$ |
|---|---|---|
| C | 64.4 | 64.4 |
| H | 10.2 | 9.8 |

Molecular weight (Menzies-Wright)=1370; viscosity at 100° C.=950 cks.

Example 2

Following the general procedure described in Example 1, 131 grams (3.1 mols) of ketene was bubbled into a cooled solution of 1440 grams (10.0 mols) of 2-ethoxy-4-methyltetrahydropyran and 44 cc. of a 32% solution of boron trifluoride in diethyl ether. The reaction mixture was maintained between —8° and —3° C., and the ketene was added at an average rate of 52.5 grams per hour. The catalyst was then neutralized by the addition to the mixture of a solution of 57 grams of sodium acetate in 250 cc. of water. During the reaction 101.5 grams (2.4 mols) of ketene was absorbed. Two liters of diisopropyl ether then was introduced as a diluent, and the organic layer which separated was extracted 10 times with a total of 1500 cc. of water for complete removal of all salts. After the entrained water and diisopropyl ether were removed by distillation, 1010 grams (7.0 mol) of unreacted 2-ethoxy-4-methyltetrahydropyran was recovered by distillation to a kettle temperature of 180° C. under a pressure of 1 mm. of mercury. The residual adduct of ketene and 2-ethoxy-4-methyltetrahydropyran was recovered as 440 grams of a light-yellow viscous oil having the following properties: saponification equivalent=184 (theory=186.2); elemental analysis in percent by weight:

|   | Found | Calculated for $(C_{10}H_{18}O_2)_x$ |
|---|---|---|
| C | 64.2 | 64.4 |
| H | 10.1 | 9.8 |

Viscosity at 100° C. (Ubbelohde Viscosimeter=2900 cks.); molecular weight=2700.

*Example 3*

Following the general procedure described in Example 1, during 2 hours 81 grams (1.9 mols) of ketene was added to a solution of 13.6 cc. of a 32% solution of boron trifluoride in diethyl ether and 871 grams (4.6 mols) of 2,6-diethoxy-4-methyltetrahydropyran, maintained at between —10° C. and —3° C. Of the ketene added, 65 grams (1.55 mols) was absorbed during the reaction. After neutralization of the acidic catalyst with aqueous sodium acetate, one liter of diisopropyl ether was added, and the organic layer which separated was extracted with water to remove inorganic salts. The residual water and the ether then were removed by distillation, following which 505 grams (2.7 mols) of unreacted 2,6-diethoxy-4-methyltetrahydropyran was removed by distillation to a kettle temperature of 150° C. under a pressure of 2 mm. of mercury. The residual adduct of ketene and 2,6-diethoxy-4-methyltetrahydropyran was recovered in the form of a light-orange colored viscous oil having the following properties: saponification equivalent=232; viscosity at 100° C.=17.8 cks.; molecular weight=474; elemental analysis in percent by weight: C=63.7, H=10.2.

*Example 4*

Into a solution of 125 grams (0.66 mol) of 2,6-diethoxy-4-methyltetrahydropyran and 4 cc. of a 32% solution of boron trifluoride in diethyl ether was introduced 85.5 grams (2.0 mols) of ketene during 2 hours while maintaining the reaction mixture between —10° and +5° C. The absorbed ketene amounted to 30 grams (0.71 mol). After neutralization of the catalyst in the manner described in Example 1, the inorganic salts were removed by extraction with water of a solution of the reaction mixture in 200 cc. of diisopropyl ether. After removal of water and diisopropyl ether 18.5 grams (0.1 mol) of unreacted 2,6-diethoxy-4-methyltetrahydropyran was recovered by distillation at a kettle temperature of 125° C. under 2 mm. of mercury pressure. The polymeric adduct, which was recovered in the form of 93 grams of a viscous orange-colored oil, had the following properties: saponification equivalent=167.5; viscosity at 100° C.=24.2 cks.; molecular weight (Menzies-Wright) =516.

*Example 5*

Into an agitated cold solution of 858.5 grams (4.25 mols) of 6-carbethoxy-2-ethoxytetrahydropyran and 13.4 cc. of a 32% solution of boron trifluoride in diethyl ether was added 81.5 grams (1.94 mol) of ketene during one hour, while maintaining the mixture at between —10° C. and +10° C. The acidic catalyst then was neutralized with aqueous sodium acetate. It was determined that 68 grams (1.6 mols) of ketene had been absorbed during the reaction. The neutralized mixture was diluted with one liter of diisopropyl ether, and the organic layer which then separated was extracted with water to remove contained salts. Thereafter, the water and diisopropyl ether were removed by distillation, followed by the removal of 510 grams (2.5 mols) of unreacted 6-carbethoxy-2-ethoxytetrahydropyran by distillation to a kettle temperature of 180° C. under a pressure of 0.5 mm. of mercury. The residual adduct was recovered in the form of a viscous light-yellow liquid having the following properties: saponification equivalent=124.7 (theory=122); viscosity at 100° C.=1453 cks.; molecular weight 1740; elemental analysis, in percent by weight:

|   | Found | Calculated for $(C_{12}H_{20}O_4)_x$ |
|---|---|---|
| C | 59.1 | 59.0 |
| H | 8.4 | 8.25 |

*Example 6*

Following the general procedure described in Example 2, 87 grams (2.1 mols) of ketene was fed at a rate of 17.4 grams per hour to a solution of 651 grams (4.9 mols) of 2-ethoxytetrahydropyran and 20.3 cc. of a 32% solution of boron trifluoride in diethyl ether, maintained at a reaction temperature between —9° and +1° C. After neutralization of the acidic catalyst with aqueous sodium acetate the mixture was diluted with 1100 cc. of diisopropyl ether, and the organic layer which separated was then extracted with water for complete removal of inorganic salts. The resultant solution was stripped of water and diisopropyl ether, after which 231 grams (1.75 mols) of unreacted 2-ethoxytetrahydropyran was recovered by distillation to a kettle temperature of 125° C. under a pressure of 2 mm. of mercury. The residual adduct of ketene and 2-ethoxytetrahydropyran was recovered in the form of 285 grams of a viscous light-yellow oil having the following properties: saponification equivalent=174 (theory=172); viscosity at 100° C.=1492 cks.; molecular weight=1600; elemental analysis, in percent by weight:

|   | Found | Calculated for $(C_9H_{16}O_3)_x$ |
|---|---|---|
| C | 62.8 | 62.7 |
| H | 9.4 | 9.4 | probable structure of polymeric composition

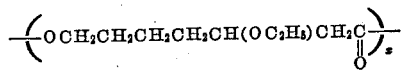

wherein $x=9.3$ (as calculated from the determination of average molecular weight).

*Example 7*

Into a solution of 535 grams (2.5 mols) of 2-[2-ethylhexoxy]tetrahydropyran and 8 cc. of a 32% solution of boron trifluoride in diethyl ether was introduced 135 grams (3.2 mols) of ketene at the rate of 54 grams per hour, while maintaining a reaction temperature between 0° and 10° C. The absorbed ketene amounted to 55 grams (1.3 mols). After neutralization of the catalyst and removal of salts in the manner described in Example 6, 260 grams (1.2 mols) of unreacted 2-[2-ethylhexoxy] tetrahydropyran was recovered by distillation to 200° C. under 2 mm. of mercury pressure. The polymeric adduct, which was recovered in the form of 250 grams of a viscous dark-brown oil, had the following properties: saponification equivalent=258.5 (theory=256); molecular weight=1360.

Those polymeric compositions of this invention produced by the reaction of ketene and the 2-alkoxytetrahydropyrans readily yield 3-alkoxy-7-hydroxyheptanoic acids and hydrocarbon-substituted 3-alkoxy-7-hydroxyheptanoic acids upon saponification thereof in known manner in the presence of a saponification catalyst such as an alkali metal hydroxide, and of a volatile solvent such as ethanol. After removal of the solvent from the reaction mixture it is neutralized with a mineral acid such as sulfuric acid and the desired organic acid is extracted from the neutralized mixture with a suitable organic solvent such as ethyl ether, and is then recovered from the extract after drying the same.

The resultant organic acid is esterified in well known manner, as by refluxing it with an excess of an alkanol or other alcoholic esterifying agent, in the presence of a volatile solvent such as diisopropyl ether and an esterification catalyst such as sulfuric acid or other mineral acid, removing water as formed in the reaction. The acid catalyst then is neutralized by an alkaline compound such as sodium ethoxide or the like; and the desired ester then is removed from the reaction mixture by vacuum distillation.

The effective use of the polymeric compositions of the invention for the production of monomeric polyfunctional carboxylic acids and esters thereof is illustrated in Example 8.

Example 8

A mixture of 172 grams (1 mol) of the polymeric composition derived from a reaction of 2-ethoxytetrahydropyran and ketene as described in Example 6, and having a molecular weight of 1420, 70.1 grams (1.25 mols) of potassium hydroxide, 400 cc. of ethanol and 200 cc. of water was heated at reflux for 11 hours. The ethanol then was removed by distillation, and the aqueous salt solution was neutralized with sulfuric acid. The homogeneous solution obtained was extracted with three 300 cc. portions of ethyl ether, and the combined extracts were dried over sodium sulphate. The pale orange viscous liquid, 3-ethoxy-7-hydroxyheptanoic acid, which remained after removal of the ether, weighed 135 grams. It had a neutralization equivalent of 194 (theory for 3-ethoxy-7-hydroxyheptanoic acid=190).

This acid was esterified by refluxing 106 grams (0.55 mol) thereof with 253 grams (5.5 mols) of ethanol in the presence of 0.5 weight percent of sulfuric acid and 100 cc. of diisopropyl ether. After formation of water in the column head had ceased, the acid catalyst was neutralized with sodium ethoxide. The resultant ethyl 3-ethoxy-7-hydroxyheptanoate was distilled at 126° to 130° C. at 0.7 to 1.0 mm. of mercury pressure. This compound had the following properties: saponification equivalent 219 (theory=218.3); molecular weight, as determined by hydroxyl analysis: 219.5 (theory=218.3); elemental analysis, in percent by weight:

|   | Found | Calculated for $C_{11}H_{22}O_4$ |
|---|---|---|
| C | 60.5 | 60.5 |
| H | 10.4 | 10.15 |

The invention is susceptible of modification within the scope of the appended claims.

We claim:

1. A polymeric composition consisting of the polymeric reaction product made by condensing, in the presence of an acidic catalyst, from 1 to 2 mols of ketene per mol of a heterocyclic compound of the structure

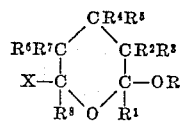

wherein each $R^1$ to $R^8$, respectively, designates a radical of the class consisting of hydrogen and the lower alkyl radicals; R designates an alkyl radical having from 1 to 18 carbon atoms; and X designates a radical of the class consisting of hydrogen, the lower alkyl radicals, the alkoxy radicals having 1 to 18 carbon atoms, and the carbalkoxy radicals having 2 to 9 carbon atoms.

2. Polymeric compositions consisting of the polymeric reaction products made by condensing, in the presence of an acidic catalyst, ketene and a compound of the class consisting of the 2-alkoxytetrahydropyrans and the lower alkyl ring-substituted 2-alkoxytetrahydropyrans, said compound being free from other substituents, in the molar ratio of 1 to 2 mols of ketene per mol of the said pyran, said alkoxy group having 1 to 18 carbon atoms.

3. Polymeric compositions consisting of the polymeric reaction products made by condensing in the presence of an acidic catalyst, ketene and a compound of the class consisting of the 2,6-dialkoxytetrahydropyrans and the lower alkyl ring-substituted, 2,6-dialkoxytetrahydropyrans, said compound being free from other substituents, in the molar ratio of 1 to 2 mols of ketene per mol of the said pyran, each of said alkoxy groups having 1 to 18 carbon atoms.

4. Polymeric compositions consisting of the polymeric reaction products made by condensing, in the presence of an acidic catalyst, ketene and a compound of the class consisting of the 2-alkoxy-6-carbalkoxytetrahydropyrans and the lower alkyl ring-substituted 2-alkoxy-6-carbalkoxytetrahydropyrans, said compound being free from other substituents, in the molar ratio of 1 to 2 mols of ketene per mol of the said pyran, said alkoxy group having 1 to 18 carbon atoms, and said carbalkoxy group having 2 to 9 carbon atoms.

5. Process for making polymeric compositions, which comprises condensing, in the presence of an acidic catalyst, ketene and a heterocyclic compound of the structure

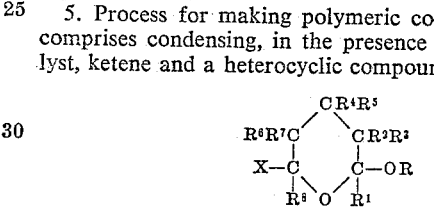

wherein $R^1$ to $R^8$, respectively, designates a radical of the class consisting of hydrogen and the lower alkyl radicals; R designates an alkyl radical having from 1 to 18 carbon atoms; X designates a radical of the class consisting of hydrogen, the lower alkyl radicals, the alkoxy radicals having 1 to 18 carbon atoms, and the carbalkoxy radicals having from 2 to 9 carbon atoms, in the molar ratio of from 1 to 2 mols of ketene per mol of said heterocyclic compound.

6. Process as defined in claim 5, wherein the condensation reaction is conducted at temperatures within the range between about −80° C. and about 100° C.

7. As new compounds, polymeric compositions consisting of the polymeric reaction products made by condensing, in the presence of an acidic catalyst, ketene and 2-ethoxytetrahydropyran, in the molar ratio of 1 to 2 mols of ketene per mol of the said pyran.

8. As new compounds, polymeric compositions consisting of the polymeric reaction products made by condensing, in the presence of an acidic catalyst, ketene and 2(2-ethylhexoxy)tetrahydropyran, in the molar ratio of 1 to 2 mols of ketene per mol of the said pyran.

9. As new compounds, polymeric compositions consisting of the polymeric reaction products made by condensing, in the presence of an acidic catalyst, ketene and 2-ethoxy-4-methyltetrahydropyran, in the molar ratio of 1 to 2 mols of ketene per mol of the said pyran.

10. As new compounds, polymeric compositions consisting of the polymeric reaction products made by condensing, in the presence of an acidic catalyst, ketene and 2,6-diethoxy-4-methyltetrahydropyran, in the molar ratio of 1 to 2 mols of ketene per mol of the said pyran.

11. As new compounds, polymeric compositions consisting of the polymeric reaction products made by condensing, in the presence of an acidic catalyst, ketene and 6-carbethoxy-2-ethoxytetrahydropyran, in the molar ratio of 1 to 2 mols of ketene per mol of the said pyran.

References Cited in the file of this patent

UNITED STATES PATENTS 2,311,534   Gleason _____ Feb. 16, 1943